United States Patent
Henry et al.

(10) Patent No.: US 9,933,555 B2
(45) Date of Patent: Apr. 3, 2018

(54) RECEPTACLE ASSEMBLY HAVING A LIGHT PIPE ASSEMBLY

(71) Applicant: TYCO ELECTRONICS CORPORATION, Berwyn, PA (US)

(72) Inventors: Randall Robert Henry, Harrisburg, PA (US); Michael John Phillips, Camp Hill, PA (US); Brandon Michael Matthews, McAlisterville, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 15 days.

(21) Appl. No.: 15/069,234

(22) Filed: Mar. 14, 2016

(65) Prior Publication Data
US 2017/0261674 A1  Sep. 14, 2017

(51) Int. Cl.
F21V 5/00 (2015.01)
F21V 8/00 (2006.01)
G08B 5/36 (2006.01)

(52) U.S. Cl.
CPC ........... *G02B 6/0006* (2013.01); *G02B 6/008* (2013.01); *G08B 5/36* (2013.01)

(58) Field of Classification Search
CPC ....... G02B 6/0006; G02B 6/0008; G08B 5/36
See application file for complete search history.

(56) References Cited

U.S. PATENT DOCUMENTS

| | | | |
|---|---|---|---|
| 7,529,094 B2* | 5/2009 | Miller .................. | G02B 6/4246 165/185 |
| 7,621,773 B2 | 11/2009 | Bright et al. | |
| 7,670,170 B2 | 3/2010 | Henry et al. | |
| 8,335,416 B2 | 12/2012 | Shirk et al. | |
| 8,393,917 B2 | 3/2013 | Regnier | |
| 8,684,765 B2* | 4/2014 | Shirk .................. | G02B 6/0008 362/551 |
| 9,616,808 B2* | 4/2017 | De Wind ............. | B60Q 1/2665 |
| 2005/0254772 A1* | 11/2005 | Long .................... | G02B 6/0008 385/146 |

* cited by examiner

*Primary Examiner* — Ali Alavi (57) ABSTRACT

A receptacle assembly includes a receptacle housing having panels defining a housing cavity receiving a pluggable module. The panels are conductive to provide electromagnetic interference shielding. The receptacle housing has a bottom mounted to a circuit board. A communication module is received in the housing cavity and mounted to the circuit board. The communication module includes a communication connector interfacing with the pluggable module. The receptacle assembly includes a light pipe assembly coupled to the receptacle housing having has a plurality of flexible light pipes each extending between a light-receiving end and a light-emitting end. The light-receiving end is positioned proximate to the bottom to receive light from a light-emitting device mounted to the circuit board. The light-emitting end is provided proximate to the front end of the receptacle housing for displaying a status indicator for the communication connector.

20 Claims, 7 Drawing Sheets

US 9,933,555 B2

RECEPTACLE ASSEMBLY HAVING A LIGHT PIPE ASSEMBLY

BACKGROUND OF THE INVENTION

The subject matter described herein relates to communication systems.

At least some known communication systems include receptacle assemblies, such as input/output (I/O) connector assemblies, that are configured to receive a pluggable module and establish a communicative connection between the pluggable module and an electrical connector of the receptacle assembly. As one example, a known receptacle assembly includes a receptacle housing that is mounted to a circuit board and configured to receive a small form-factor (SFP) pluggable transceiver. The receptacle assembly includes an elongated cavity that extends between an opening of the cavity and an electrical connector that is disposed within the cavity and mounted to the circuit board. The pluggable module is inserted through the opening and advanced toward the electrical connector in the cavity. The pluggable module and the electrical connector have respective electrical contacts that engage one another to establish a communicative connection. Conventional communication systems may include multiple cavities and communication connectors for mating with multiple pluggable modules.

Some known communication systems utilize status indicators that are visible on the front chassis or bezel of the system to indicate to the user the connection and/or transmission status of the various I/O connector assemblies and pluggable modules. In conventional systems, light-emitting diodes (LEDs) are placed on the host circuit board in an area where the emitted light from the LEDs is piped by a rigid molded lightpipe to the front bezel. The number of status indicators per port, along with the location at the port and on the circuit board, as well as the size and shape of the receptacle housing may vary greatly among different products or customers. As such, a manufacturer is faced with the problem and expense of retooling the rigid molded light pipes to meet different customer requirements. Additionally, some communication systems have complex routing of the light pipes and/or routing of the light pipes in areas needed for cooling of the other components of the system, such as the pluggable modules.

Accordingly, there is a need for a communication system design that provides configurable status indicators to meet customer needs.

BRIEF DESCRIPTION OF THE INVENTION

In an embodiment, a receptacle assembly is provided including a receptacle housing having a plurality of panels defining a housing cavity configured to receive a pluggable module through a front end of the receptacle housing. The panels are conductive to provide electromagnetic interference (EMI) shielding. The receptacle housing has a bottom being configured to be mounted to a circuit board. A communication module is received in the housing cavity and configured to be mounted to the circuit board. The communication module includes a communication connector configured to interface with the pluggable module. The receptacle assembly includes a light pipe assembly coupled to the receptacle housing. The light pipe assembly has a plurality of flexible light pipes each having a light pipe body extending between a light-receiving end and a light-emitting end. The light pipe body is flexible. The light-receiving end is positioned proximate to the bottom to receive light from a light-emitting device mounted to the circuit board proximate the receptacle assembly. The light-emitting end is provided proximate to the front end of the receptacle housing for displaying a status indicator for the communication connector.

In another embodiment, a receptacle assembly is provided including a receptacle housing having a plurality of panels defining a housing cavity configured to receive a pluggable module through a front end of the receptacle housing at a bezel. The panels are conductive to provide electromagnetic interference (EMI) shielding. The panels define a back wall opposite the front end, a top wall opposite a bottom of the receptacle housing and side walls surrounding the housing cavity. The receptacle housing is configured to be mounted to a circuit board. A communication module is received in the housing cavity and configured to be mounted to the circuit board. The communication module includes a communication connector configured to interface with the pluggable module. The receptacle assembly includes a light pipe assembly coupled to the receptacle housing. The light pipe assembly has a circuit board support, a bezel support and a plurality of flexible light pipes extending between the circuit board support and the bezel support. The circuit board support is coupled to the receptacle housing proximate to the bottom for positioning near the circuit board. The bezel support is coupled to the receptacle housing proximate to the front end for positioning near the bezel. Each light pipe has a light pipe body extending between a light-receiving end and a light-emitting end. The light pipe body is flexible. The light-receiving end is received in the circuit board support to receive light from a light-emitting device mounted to the circuit board proximate the receptacle assembly. The light-emitting end is held by the bezel support proximate to the front end of the receptacle housing for displaying a status indicator for the communication connector.

In a further embodiment, a communication system is provided including a circuit board having a mounting area and a plurality of light-emitting devices proximate the mounting area, a bezel forward of the circuit board having an opening and a receptacle assembly mounted to the mounting area and extending behind the opening in the bezel. The receptacle assembly includes a receptacle housing having a plurality of panels defining a housing cavity configured to receive a pluggable module through a front end of the receptacle housing at a bezel. The panels are conductive to provide electromagnetic interference (EMI) shielding. The panels define a back wall opposite the front end, a top wall opposite a bottom of the receptacle housing and side walls surrounding the housing cavity. The receptacle housing is configured to be mounted to a circuit board. A communication module is received in the housing cavity and configured to be mounted to the circuit board. The communication module includes a communication connector configured to interface with the pluggable module. The receptacle assembly includes a light pipe assembly coupled to the receptacle housing. The light pipe assembly has a circuit board support, a bezel support and a plurality of flexible light pipes extending between the circuit board support and the bezel support. The circuit board support is coupled to the receptacle housing proximate to the bottom for positioning near the circuit board. The bezel support is coupled to the receptacle housing proximate to the front end for positioning near the bezel. Each light pipe has a light pipe body extending between a light-receiving end and a light-emitting end. The light pipe body is flexible. The light-receiving end is received in the circuit board support to receive light from a light-emitting device mounted to the circuit board proximate the receptacle assembly. The light-emitting end is held by the bezel support proximate to the front end of the receptacle housing for displaying a status indicator for the communication connector forward of the bezel.

DETAILED DESCRIPTION OF THE INVENTION

Embodiments set forth herein include communication systems providing electromagnetic interference (EMI) shielding and significant thermal transfer for the components thereof. Various embodiments of the communication system provide EMI shielding at the interface between pluggable modules and corresponding communication connectors. Various embodiments of the communication system provide a receptacle housing or cage that allows significant airflow therethrough while maintaining EMI shielding in a robust and compact design. Various embodiments of the communication system include multiple communication connectors stacked and ganged together in a dense package while providing EMI shielding for the interfaces between the communication connectors and the pluggable modules.

Embodiments set forth herein include communication systems providing status indicators for indicating the connection and/or transmission status of various components of the communication system. Various embodiments of the communication system provide flexible light pipes piped between light-emitting devices on the circuit board and the front chassis or bezel of the communication system. The light pipes are robust and configurable to accommodate different variations of components, such as cages having different heights, different lengths, different shapes, different routing locations and the like.

Figure 1:
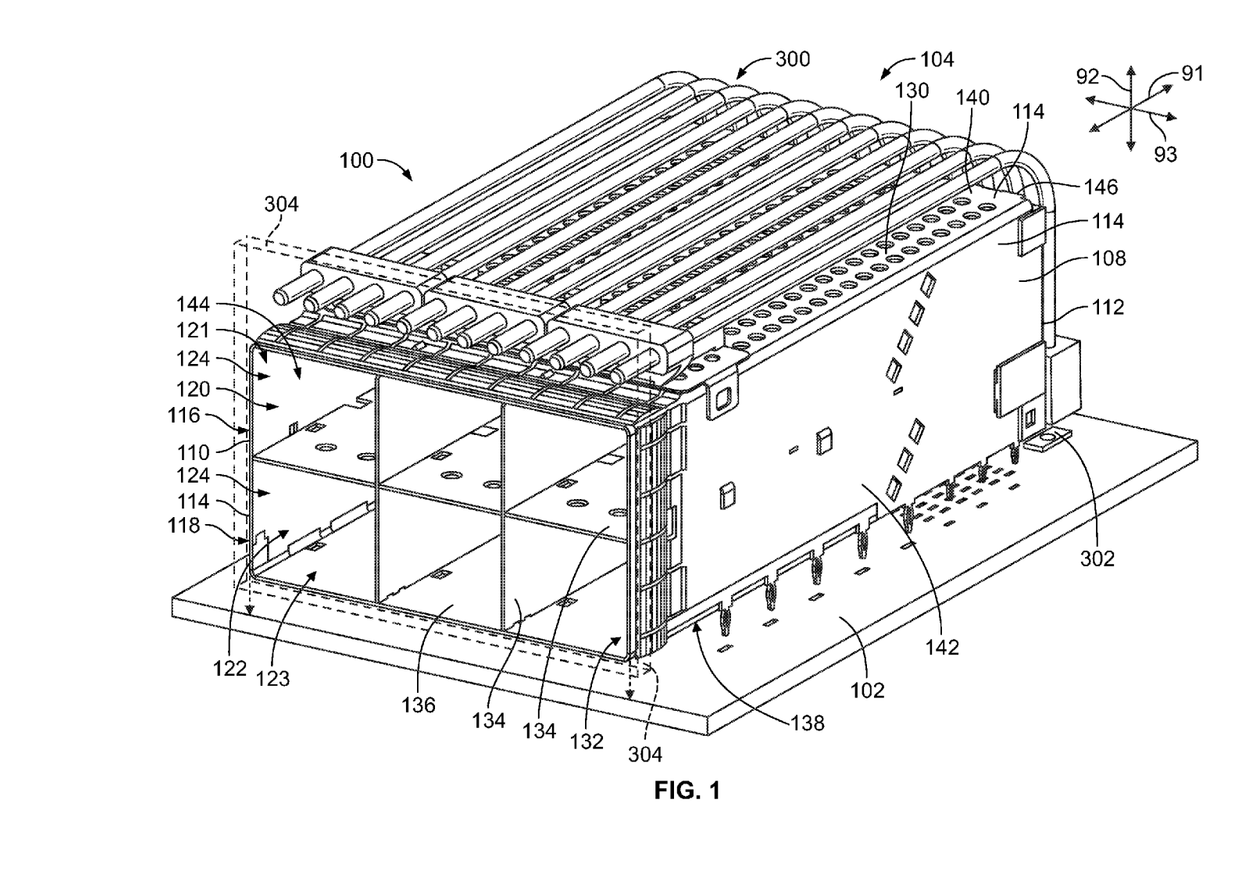
FIG. 1 is a perspective view of a communication system in accordance with an embodiment.

FIG. 1 is a perspective view of a communication system 100 in accordance with an embodiment. The communication system 100 may include a circuit board 102, a receptacle assembly 104 mounted to the circuit board 102, and one or more pluggable modules 106 (shown in FIG. 2) that are configured to communicatively engage the receptacle assembly 104. The receptacle assembly 104 is shown poised for mounting to the circuit board 102. The receptacle assembly 104 includes a light pipe assembly 300 coupled to a receptacle housing 108 of the receptacle assembly 104. The light pipe assembly 300 pipes light from light-emitting devices 302, such as light-emitting diodes (LEDs), on the circuit board 102 to a front chassis or bezel 304 (shown in phantom in FIG. 1) of the communication system 100. The bezel 304 includes an opening and the receptacle assembly 104 is aligned with the opening. Optionally, a portion of the receptacle assembly 104 may pass into or through the opening. The light pipe assembly 300 is visible forward of the bezel 304 to provide status indicators for the various components of the receptacle assembly 104 and the pluggable modules 106.

The communication system 100 is oriented with respect to a mating or insertion axis 91, an elevation axis 92, and a lateral axis 93. The axes 91-93 are mutually perpendicular. Although the elevation axis 92 appears to extend in a vertical direction parallel to gravity in FIG. 1, it is understood that the axes 91-93 are not required to have any particular orientation with respect to gravity. Moreover, only one pluggable module 106 is shown in FIG. 1, but it is understood that multiple pluggable modules 106 may simultaneously engage the receptacle assembly 104.

The communication system 100 may be part of or used with telecommunication systems or devices. For example, the communication system 100 may be part of or include a switch, router, server, hub, network interface card, or storage system. In the illustrated embodiment, the pluggable module 106 is configured to transmit data signals in the form of electrical signals. In other embodiments, the pluggable module 106 may be configured to transmit data signals in the form of optical signals. The circuit board 102 may be a daughter card or a mother board and include conductive traces (not shown) extending therethrough.

The receptacle assembly 104 includes the receptacle housing 108, which is mounted to the circuit board 102. The receptacle housing 108 may also be referred to as a receptacle cage. The receptacle housing 108 may be arranged at the bezel 304 or faceplate of the chassis of the system or device, with a majority of the receptacle housing 108 behind the bezel 304. As such, the receptacle housing 108 is interior of the device and corresponding bezel 304 and the pluggable module(s) 106 is loaded into the receptacle housing 108 from outside or exterior of the device and corresponding bezel 304. In the illustrated embodiment, the light pipe assembly 300 is routed along the exterior of the receptacle housing 108; however, portions of the light pipe assembly 300 may be routed interior of the receptacle housing 108 in other various embodiments.

The receptacle housing 108 includes a front end 110 and an opposite back end 112. The front end 110 may be provided at, and extend through, the opening in the bezel 304. The mating axis 91 may extend between the front and back ends 110, 112. Relative or spatial terms such as "front," "back," "top," or "bottom" are only used to distinguish the referenced elements and do not necessarily require particular positions or orientations in the communication system 100 or in the surrounding environment of the communication system 100. For example, the front end 110 may be located in or facing a back portion of a larger telecommunication system. In many applications, the front end 110 is viewable to a user when the user is inserting the pluggable module 106 into the receptacle assembly 104. The light pipe assembly 300 is viewable to the user at the front end 110 or exterior of the bezel 304.

The receptacle housing 108 is configured to contain or block electromagnetic interference (EMI) and guide the pluggable module(s) 106 during a mating operation. To this end, the receptacle housing 108 includes a plurality of conductive housing walls 114 that are interconnected with one another to form the receptacle housing 108. The housing walls 114 may be formed from a conductive material, such as sheet metal and/or a polymer having conductive particles. In the illustrated embodiment, the housing walls 114 are stamped and formed from sheet metal. In some embodiments, the receptacle housing 108 is configured to facilitate airflow through the receptacle housing 108 to transfer heat (or thermal energy) away from the receptacle assembly 104 and pluggable module(s) 106. The air may flow from inside the receptacle housing 108 (for example, behind the faceplate) to the external environment (for example, forward of the faceplate) or from outside the receptacle housing 108 into the interior of the receptacle housing 108. Fans or other air moving devices may be used to increase airflow through the receptacle housing 108 and over the pluggable module(s) 106. The housing walls 114 may include openings to allow airflow therethrough. The openings may be sized small enough such that the housing walls 114 provide effective EMI shielding. Providing the light pipe assembly 300 exterior of the receptacle housing 108, as in the illustrated embodiment, allows a greater amount of airflow within the receptacle housing 108 for cooling, as opposed to embodiments having portions of the light pipe assembly 300 routed within the receptacle housing 108.

In the illustrated embodiment, the receptacle housing 108 includes a first (or upper) row 116 of elongated module cavities 120 and a second (or lower) row 118 of elongated module cavities 122. Each of the module cavities 120, 122 extends between the front and back ends 110, 112. The module cavities 120, 122 have respective openings or ports 121, 123 that are sized and shaped to receive corresponding pluggable modules 106. The module cavities 120, 122 may have the same or similar dimensions and extend lengthwise in a direction that is parallel to the mating axis 91. In the illustrated embodiment, each upper module cavity 120 is stacked over a corresponding lower module cavity 122 such that the lower module cavity 122 is positioned between the upper module cavity 120 and the circuit board 102. In an exemplary embodiment, the module cavities 120, 122 are arranged in a plurality of columns. Any number of module cavities may be provided including a single row and/or a single column of module cavities.

The housing walls 114 of the receptacle housing 108 may form separator plates between the module cavities 120, 122. The separator plates may extend generally parallel to the mating axis 91 at least partially between the front end 110 and the back end 112. In an exemplary embodiment, the module cavities 120, 122 include airflow channels 124 at the front end 110 to allow airflow therethrough along the pluggable modules 106, such as along top surfaces of the pluggable modules 106, to enhance heat transfer of the pluggable modules 106 located in the module cavities 120, 122. The size of the airflow channels 124 is increased by providing the light pipe assembly 300 along the exterior of the receptacle housing 108, as opposed to routing the light pipe assembly interior of the receptacle housing 108, such as between the upper and lower module cavities 120, 122; however such routing is possible in alternative embodiments where cooling of the components is less important.

The receptacle housing 108 is formed from a plurality of interconnected panels or sheets. For example, the receptacle housing 108 includes a main panel or shell 130 that surrounds a housing cavity 132, a plurality of interior panels 134 and a base panel 136 at a bottom 138 of the receptacle housing 108. The base panel 136 may rest on the circuit board 102. The main panel 130, the interior panels 134, and the base panel 136 may be stamped and formed from sheet metal. The main panel 130, the interior panels 134, and the base panel 136 are assembled to form the module cavities 120, 122. In an exemplary embodiment, the main panel 130 includes a top wall 140, sidewalls 142, 144, and a back wall 146 formed integral with each other; however any of such walls may be separate and coupled to the other walls. The interior panels 134 are configured to be positioned within the housing cavity 132. The interior panels 134 apportion or divide the housing cavity 132 into the separate module cavities 120, 122.

The main panel 130, the interior panels 134, and the base panel 136 may comprise conductive material, such as metal. When the receptacle housing 108 is mounted to the circuit board 102, the receptacle housing 108 and the receptacle assembly 104 are electrically coupled to the circuit board 102 and, in particular, to ground planes (not shown) within the circuit board 102 to electrically ground the receptacle housing 108 and the receptacle assembly 104. As such, the receptacle assembly 104 may reduce EMI leakage that may negatively affect electrical performance of the communication system 100.

The pluggable module 106 is an input/output (I/O) module configured to be inserted into and removed from the receptacle assembly 104. The pluggable module 106 is configured to be inserted into one of the module cavities 120, 122 of the receptacle housing 108 and advanced in a mating direction along the mating axis 91. In some embodiments, the pluggable module 106 is a small form-factor pluggable (SFP) transceiver or quad small form-factor pluggable (QSFP) transceiver. The pluggable module 106 may satisfy certain technical specifications for SFP or QSFP transceivers, such as Small-Form Factor (SFF)-8431. In some embodiments, the pluggable module 106 is configured to transmit data signals up to 2.5 gigabits per second (Gbps), up to 5.0 Gbps, up to 10.0 Gbps, or more. By way of example, the receptacle assembly 104 and the pluggable module 106 may be similar to the receptacle cages and transceivers, respectively, which are part of the SFP+ product family available from TE Connectivity.

The receptacle assembly 104 includes a connector module assembly 148 (shown in FIG. 3) at the back end 112. The pluggable module(s) 106 is mated with the connector module assembly 148. In an exemplary embodiment, EMI shielding is provided at the connector module assembly to provide electrical shielding at the interface with the pluggable modules 106. For example, one or more gaskets may be provided at the mating interfaces. The EMI shielding is electrically connected to the conductive housing walls 114 to electrically common the EMI shielding of the connector module assembly 148 with the other portions of the receptacle housing 108.

Figure 2:
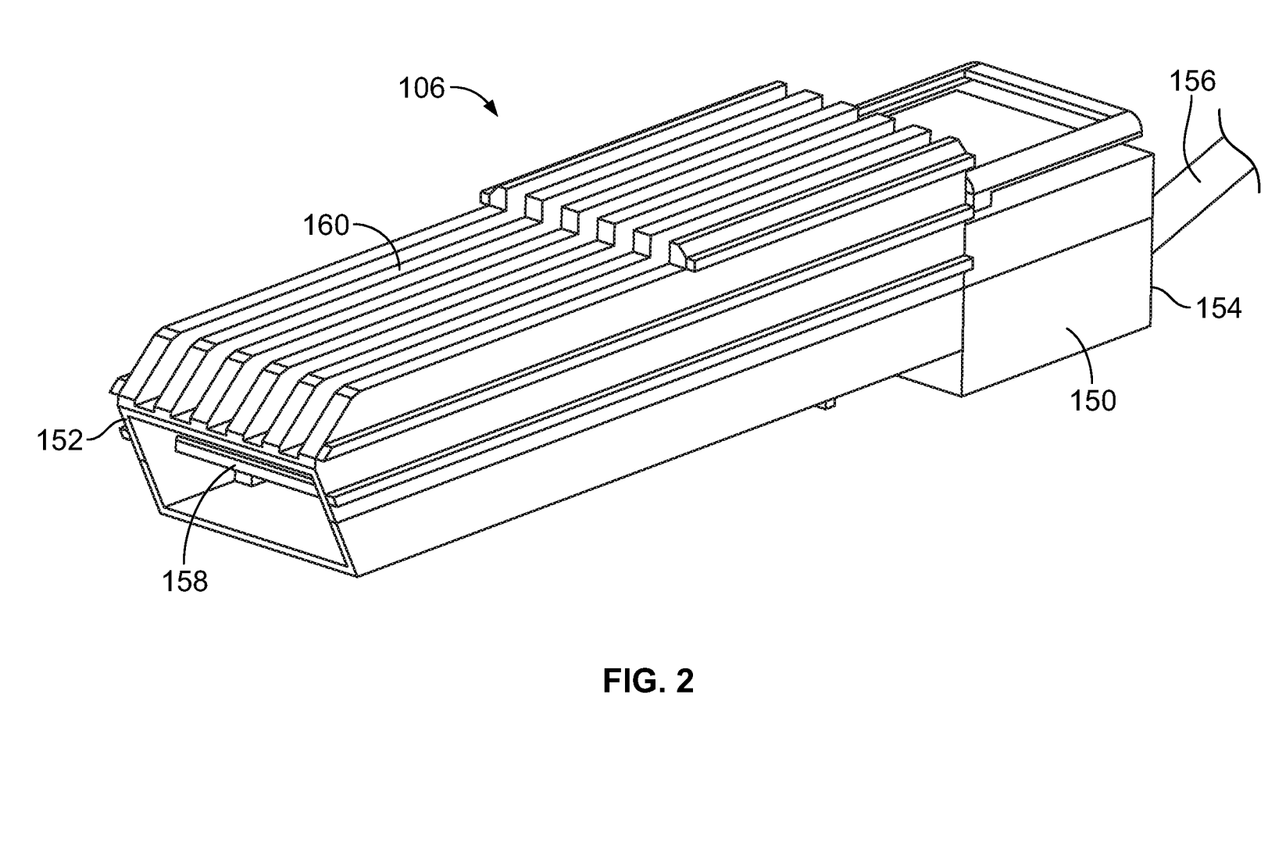
FIG. 2 is a perspective view of a pluggable module for the communication system in accordance with an exemplary embodiment.

FIG. 2 is a perspective view of the pluggable module 106 in accordance with an exemplary embodiment. In some embodiments, the pluggable module 106 is an input/output cable assembly having a pluggable body 150. The pluggable body 150 includes a mating end 152 and an opposite cable end 154. A cable 156 is coupled to the pluggable body 150 at the cable end 154. The pluggable body 150 also includes an internal circuit board 158 that is communicatively coupled to electrical wires or optical fibers (not shown) of the cable 156. The internal circuit board 158 may be exposed at the mating end 152 for mating with the connector module assembly 148 (shown in FIG. 3). The cable 156 may be communicatively coupled by directly terminating the electrical wires to the internal circuit board 158, such as by soldering the electrical wires to the internal circuit board. Alternatively, the cable 156 may be communicatively coupled by other processes, such as by using connectors at the end of the cable 156 and on the internal circuit board 158. The internal circuit board 158 is supported by the pluggable body 150.

In an exemplary embodiment, the pluggable body 150 is manufactured from a conductive material, such as a metal material. The pluggable body 150 provides EMI shielding for the circuit board 158. Optionally, the pluggable body 150 may provide heat transfer for the internal circuit board 158, such as for the electronic components on the internal circuit board 158. For example, the internal circuit board 158 is in thermal communication with the pluggable body 150 and the pluggable body 150 transfers heat from the internal circuit board 158. In an exemplary embodiment, the heat is transferred from at or near the mating end 152, such as where various electrical components are located on the internal circuit board 158, to the cable end 154. The heat is pulled out of the receptacle assembly 104 and mating end 152 and rejected to the external environment forward of the faceplate. In other embodiments, the heat may be drawn into other portions of the pluggable body 150 and/or the heat may be directed to other portions of the pluggable body 150, such as to the mating end 152 where the heat may be transferred to another heat sink or heat transferring component inside the chassis.

In an exemplary embodiment, the pluggable body 150 includes a plurality of fins 160 extending therefrom. The fins 160 increase the surface area of the pluggable body 150 and allow greater heat transfer therefrom. The fins 160 may extend from any portion of the pluggable body 150, such as the top, the sides and/or the bottom. In the illustrated embodiment, the fins 160 are parallel plates with airflow channels therebetween. The plates may extend continuously between opposite ends of the fins 160. In alternative embodiments, other types of fins 160 may be used, such as fins 160 in the form of pins or posts extending from the pluggable body 150. The pin-shaped fins 160 may be arranged in rows and columns and may be separated from each other to allow airflow around the pins and between the various pins.

Figure 3:
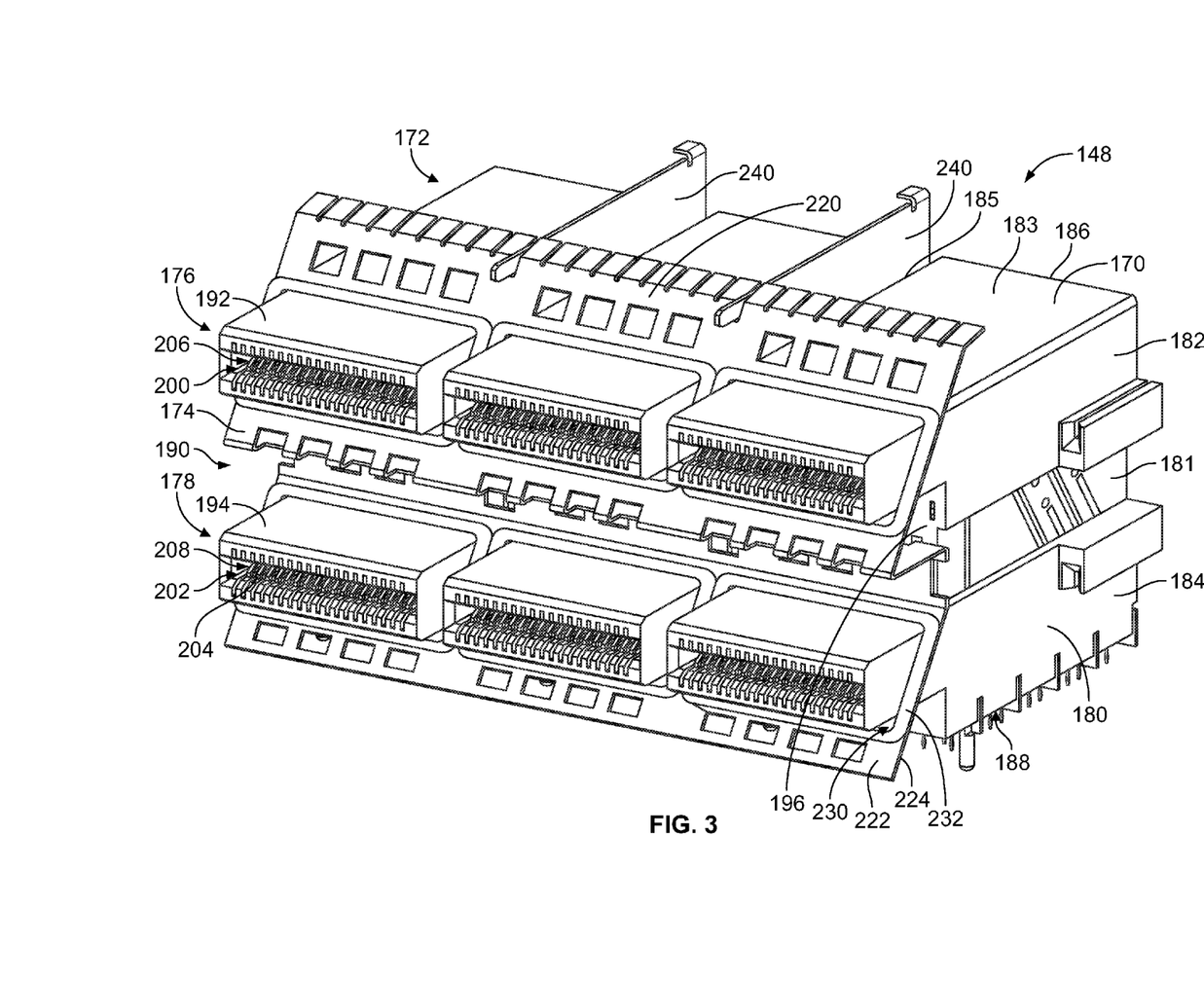
FIG. 3 is a front perspective view of a connector module assembly for the communication system in accordance with an exemplary embodiment.

FIG. 3 is a front perspective view of the connector module assembly 148 in accordance with an exemplary embodiment. The connector module assembly 148 includes a plurality of communication connectors 170, which may be ganged together to form a communication module 172. Alternatively, the communication connectors 170 may be separately and independently mounted to the circuit board 102 (shown in FIG. 1). The communication connectors 170 are configured to interface with the pluggable modules 106 (shown in FIG. 2) when the pluggable modules 106 are coupled to the connector module assembly 148.

In the illustrated embodiment, the connector module assembly 148 includes a gasket plate 174 coupled to the communication module 172. The gasket plate 174 provides EMI shielding for the connector module assembly 148. The gasket plate 174 is configured to interface with the pluggable modules 106 when the pluggable modules 106 are coupled to the connector module assembly 148. In alternative embodiments, the connector module assembly 148 may be provided without the gasket plate 174.

In an exemplary embodiment, each communication connector 170 has first and second mating interfaces 176, 178 for interfacing with different pluggable modules 106; however the communication connectors 170 may include a single mating interface or more than two mating interfaces in alternative embodiments. The first mating interface 176 is configured to be disposed within the upper module cavity 120 (shown in FIG. 1), and the second mating interface 178 is configured to be disposed within the lower module cavity 122 (shown in FIG. 1). Thus, in the illustrated embodiment, a single communication connector 170 may mate with two pluggable modules 106.

The communication connector 170 includes a housing 180 configured to hold one or more contact modules 181. The housing 180 is defined by an upstanding body portion 182 having a top 183, first and second sides 184, 185, a rear 186, a mounting face 188 configured to be mounted to the circuit board 102 (shown in FIG. 1), and a mating face 190 opposite the rear 186. Upper and lower shrouds 192 and 194 extend from the body portion 182 to define a stepped mating face 190. For example, the shrouds 192, 194 and a recessed face 196 between the shrouds 192, 194 may define the mating face 190 of the body portion 182. The shrouds 192, 194 may be generally box-shaped extensions. The shrouds 192, 194 may have other surfaces to have other shapes in alternative embodiments. For a single port cage member, the communication connector 170 may only include a single extension portion. The body portion 182 and the shrouds 192, 194 may be co-molded from a dielectric material, such as a plastic material, to form the housing 180.

Receiving slots 200 and 202 extend inwardly from the mating face 190 of each of the respective upper and lower shrouds 192, 194, and extend inwardly to the body portion 182. The receiving slots 200, 202 are configured to receive card edges of the circuit boards 158 (shown in FIG. 2) of the corresponding pluggable modules 106. A plurality of contacts 204 are held by the housing 180 and are exposed within the receiving slots 200, 202 for mating with the corresponding pluggable module 106. The contacts 204 and the receiving slots 200, 202 define portions of the first and second mating interfaces 176, 178. Optionally, the contacts 204 may be parts of the contact modules 181 stacked together and loaded into the housing 180 through the rear 186. Alternatively, the contacts 204 may be individual contacts stitched into the housing 180 or otherwise loaded into the housing 180. The contacts 204 are arranged to define an upper contact array 206 and a lower contact array 208. The contact arrays 206, 208 may include any number of the contacts 204. The contacts 204 may be signal contacts, ground contacts or other types of contacts, and the arrays 206, 208 may have the contacts 204 in any arrangement, such as a ground-signal-signal-ground arrangement with a pair of signal contacts flanked by ground contacts.

The contacts 204 extend from the mounting face 188 for termination to the circuit board 102. For example, ends of the contacts 204 may constitute pins that are loaded into plated vias of the circuit board 102. Alternatively, the contacts 204 may be terminated to the circuit board 102 in another manner, such as by surface mounting to the circuit board 102.

The upper and lower shrouds 192, 194, receiving slots 200, 202 and contacts 204 may define identical mating interfaces 176, 178 such that the mating interfaces 176, 178 are configured to mate with any pluggable module (for example, any pluggable module 106 may be plugged into the upper module cavity 120 or the lower module cavity 122 for connection to the communication connector 170). In the illustrated embodiment, each communication connector 170 has the upper contact array 206 arranged within the upper shroud 192 at the mating interface 176 configured for mating with a corresponding pluggable module 106, and each communication connector 170 has the lower contact array 208 arranged within the lower shroud 194 at the mating interface 178 configured for mating with a corresponding pluggable module 106. The upper and lower mating interfaces 176, 178 are in a stacked arrangement.

The gasket plate 174 is formed from a conductive material, such as sheet metal. In the illustrated embodiment, the gasket plate 174 is stamped and formed from sheet metal. In some embodiments, the gasket plate 174 is configured to facilitate airflow therethrough, such as through airflow openings sized small enough such that the gasket plate 174 provides effective EMI shielding. The gasket plate 174 includes one or more sheets 220 configured to provide EMI shielding for the mating interface between the pluggable modules 106 and the communication module 172. In an exemplary embodiment, the sheets 220 of the gasket plate 174 provide EMI shielding for all of the pluggable modules 106 and corresponding mating interfaces 176, 178 of the communication connectors 170. The gasket plate 174 is configured to directly contact the panels or sheets of the housing 108 (shown in FIG. 1) to electrically common the gasket plate 174 and the housing 108. The gasket plate 174 includes an exterior or front side 222 and an interior or rear side 224. The front side 222 faces the pluggable modules 106. The rear side 224 faces the communication module 172.

The gasket plate 174 includes openings 230 therethrough that receive corresponding shrouds 192, 194. Optionally, the gasket plate may include airflow openings that allow airflow through the gasket plate 174. The airflow openings may allow airflow vertically through the receptacle assembly 104, such as from the pluggable module 106 and shroud 194 associated with the lower module cavity 122 to the pluggable module 106 and shroud 192 associated with the upper module cavity 120. In an exemplary embodiment, the gasket plate 174 has pluggable module interfaces 232 at the front side 222 around the openings 230. The pluggable module interfaces 232 are configured to interface with mating ends 152 (shown in FIG. 2) of the pluggable modules 106. In an exemplary embodiment, the pluggable module interfaces 232 are gaskets and may be referred to hereinafter as gaskets 232; however other types of interfaces may be provided in alternative embodiments. The gaskets 232 may be compressible. The gaskets 232 may be conductive foam gaskets 232. The pluggable module interfaces 232 may be spring fingers or tabs. The pluggable module interfaces 232 are conductive and provide an interface between the pluggable modules 106 and the gasket plate 174.

In an exemplary embodiment, the communication module 172 includes separator panels 240 between various communication connectors 170. The separator panels 240 provide electrical shielding between the communication connectors 170. In an exemplary embodiment, the separator panels 240 are electrically connected to the gasket plate 174, such as by a direct, physical engagement therewith. The separator panels 240 may be interior panels of the receptacle housing 108.

Figure 4:
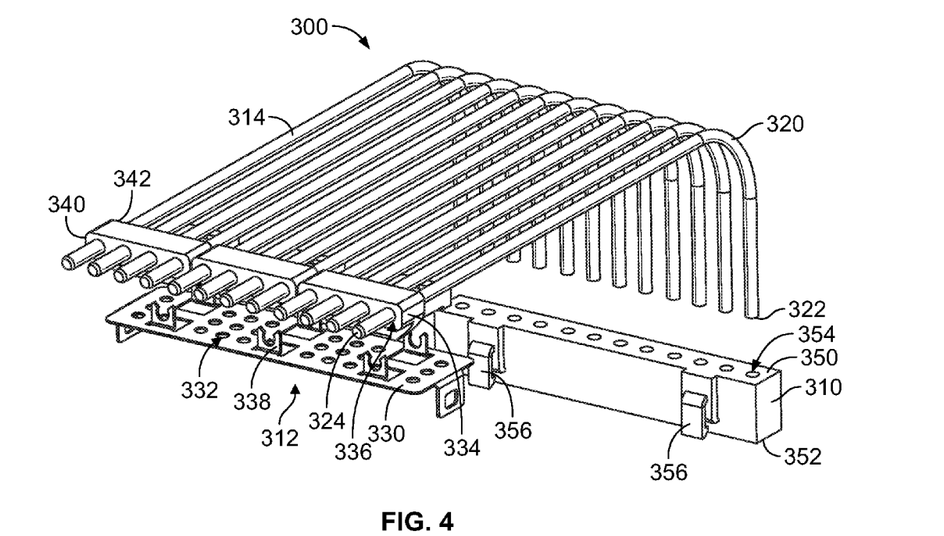
FIG. 4 is an exploded view of a light pipe assembly for the communication system in accordance with an exemplary embodiment.
Figure 5:
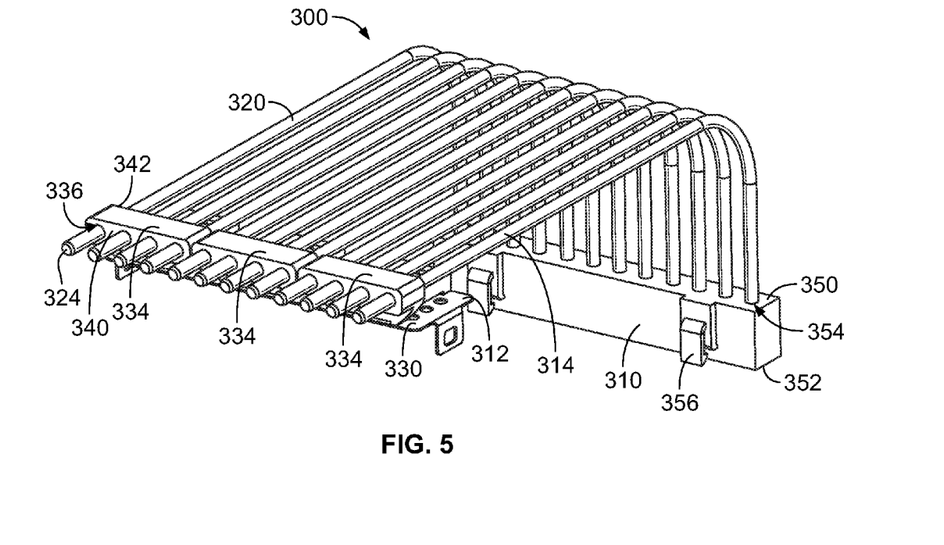
FIG. 5 is top perspective view of the light pipe assembly in an assembled state.

FIG. 4 is an exploded view of the light pipe assembly 300 in accordance with an exemplary embodiment. FIG. 5 is top perspective view of the light pipe assembly 300 in an assembled state. The light pipe assembly 300 includes a circuit board support 310, a bezel support 312 and a plurality of flexible light pipes 314 extending between the circuit board support 310 and the bezel support 312. The circuit board support 310 is configured to be coupled to the receptacle housing 108 (shown in FIG. 1) proximate to the bottom 138 for positioning near the circuit board 102 (shown in FIG. 1). The bezel support 312 is configured to be coupled to the receptacle housing 108 proximate to the front end 110 for positioning near the bezel 304 (shown in FIG. 1).

Each light pipe 314 has a light pipe body 320 extending between a light-receiving end 322 and a light-emitting end 324. The light-receiving end 322 is received in the circuit board support 310 to receive light from the corresponding light-emitting device 302 (shown in FIG. 1) mounted to the circuit board 102. The light-emitting end 324 is held by the bezel support 312 for displaying a status indicator for the corresponding communication connector 170 (shown in FIG. 3) and/or pluggable module 106 (shown in FIG. 2). In an exemplary embodiment, the light pipe body 320 is flexible and is able to be manipulated between the circuit board support 310 and the bezel support 312. In the illustrated embodiment, the light pipe 314 has a single bend (for example, approximately 90° bend) between the circuit board support 310 and the bezel support 312; however the light pipe 314 may have multiple bends in alternative embodiments. In an exemplary embodiment, the light pipe body 320 is a flexible fiber optic conductor. The light pipe body 320 may include a core and a cladding layer. The light pipe body 320 may be a plastic material, or may be another material, such as a material capable of being flexible.

The light pipes 314 are capable of being routed along any path between the circuit board support 310 and the bezel support 312. For example, the light pipes 314 may be routed along the exterior of the panels of the receptacle housing 108 and may accommodate any shape of the receptacle housing 108. The light pipes 314 may be used with different types of receptacle housings 108, such as receptacle housings 108 having different shapes (for example, receptacle housings for different applications or different customers), such as different heights (top-to-bottom), different lengths (front-to-back), different widths (side-to-side), different light-emitting device 302 arrangement, different bezel position arrangement, and the like. In an exemplary embodiment, the light pipes 314 may be cut to length, such as from a spool, to fit to the particular application and needed length between the circuit board support 310 and the bezel support 312.

The light-emitting ends 324 are held by the bezel support 312 for directing the light forward for displaying status indicators. The bezel support 312 includes a bracket 330 configured to be mounted to the receptacle housing 108 to secure the light pipe assembly 300 to the receptacle housing 108. In an exemplary embodiment, the bracket 330 is stamped and formed from sheet metal. In some embodiments, the bracket 330 is configured to facilitate airflow therethrough. For example, the bracket 330 may include airflow openings 332. The bracket 330 is mounted to the receptacle housing 108 such that the airflow openings 332 of the bracket 330 are aligned with corresponding airflow openings of the corresponding panel 130 of the receptacle housing 108 to allow airflow through the bracket 330 and the panel 130.

The bezel support 312 includes a light pipe holder 334 having light pipe channels 336 receiving corresponding light pipes 314 and holding the light pipes 314 at predetermined positions for displaying the status indicators. The light pipes 314 may be held in the light pipe channels 336 by a friction fit. The light pipes 314 may be held in the light pipe channels 336 by other means, such as fasteners, adhesive, and the like. The light pipe holder 334 may be a molded piece. The light pipe holder 334 may be manufactured from plastic. In an exemplary embodiment, the light pipe holder 334 is configured to be mounted to the bracket 330. For example, the bracket 330 may include clips or tabs 338 extending therefrom and the light pipe holder 334 may be secured to the tabs 338. The light pipe holder 334 may be secured to the bracket 330 by other means in alternative embodiments. In other embodiments, the light pipe holder 334 may be integral with the bracket 330, such as a stamped and formed piece having the light pipe channels 336 for supporting the light pipes 314. In other various embodiments, the light pipe holder 334 may be secured to the receptacle housing 108 directly rather than using the bracket 330. For example, the tabs 338 may be part of the receptacle housing 108.

The light pipe holder 334 extends between a front end 340 and a rear end 342. The light pipe channels 336 may pass through the light pipe holder 334 between the front end 340 and the rear end 342. The light pipes 314 may pass through the light pipe holder 334 with the light-emitting ends 324 extending a distance forward of the front end 340. Optionally, the portions of the light pipes 314 exposed forward of the light pipe holder 334 are configured to be received in the bezel 304 and are visible by the user for status identification. Optionally, the exposed portions at the light-emitting ends 324 may be processed to diffuse the light for the user to see. For example, the exposed portions may be textured by an Electrical Discharge Machining (EDM) or acid etch finish to enhance light diffusion at the light-emitting end 324. In alternative embodiments, a separate diffuser may be provided at the light-emitting end 324. The diffuser may be provided on the exposed portion forward of the front end 340. In alternative embodiments, the diffuser may be in the form of a lens integral with the light pipe holder 334. For example, the light-emitting ends 324 of the light pipes 314 may be received in the light pipe channels 336 in the rear end 342 and held in the light pipe holder 334. The light pipe channels 336 may extend only partially through the light pipe holder 334 such that the light pipes 314 do not extend entirely through the light pipe holder 334. Lenses may extend from the front end 340 in line with the light pipes 314 and direct the light forward of the light pipes 314 to the bezel 304 for viewing by the user.

In an alternative embodiment, the bezel support 312 and light pipe holder 334 may be mounted directly to the bezel 304 rather than being mounted to the receptacle housing 108. For example, the bezel support 312 may include mounting features, such as a clip, configured to be secured to the bezel 304.

The light-receiving ends 322 are held in the circuit board support 310. The circuit board support 310 is configured to be mounted to the receptacle housing 108 proximate to the circuit board 102 for receiving light emitted from the light-emitting devices 302 mounted to the circuit board 102. The circuit board support 310 includes a top 350 and a bottom 352. The circuit board support 310 includes a plurality of light pipe cavities 354 configured to receive the light-receiving ends 322 of the light pipes 314. The light pipe cavities 354 align the light pipes 314 with the corresponding light-emitting devices 302. The light pipes 314 may be held in the light pipe cavities 354 by a friction fit. The light pipes 314 may be held in the light pipe cavities 354 by other means, such as fasteners, adhesive, and the like.

In an exemplary embodiment, the circuit board support 310 includes mounting features 356 configured to engage the receptacle housing 108 to secure the light pipe assembly 300 to the receptacle housing 108. The mounting features 356 may be clips or latches. Any number of mounting features 356 may be provided. Optionally, the circuit board support 310 may be secured to the receptacle housing 108 after the receptacle housing 108 is mounted to the circuit board 102.

Figure 6:
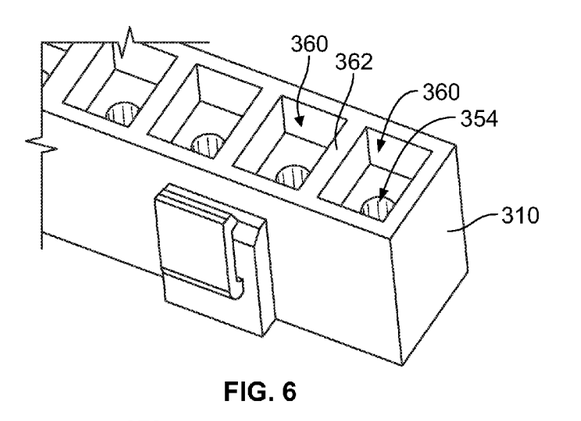
FIG. 6 is a bottom perspective view of a portion of a circuit board support of the light pipe assembly in accordance with an exemplary embodiment.

FIG. 6 is a bottom perspective view of a portion of the circuit board support 310. The circuit board support 310 includes a plurality of device cavities 360 separated from each other by separating walls 362. The device cavities 360 receive corresponding light-emitting devices 302 (shown in FIG. 1). The light pipe cavities 354 are open to corresponding device cavities 360 such that the light pipes 314 (shown in FIG. 5) in the light pipe cavities 354 may receive the light from the light-emitting devices 302 in the device cavities 360. The light-receiving ends 322 may be at least partially received in the device cavities 360. The separating walls 362 contain the light emitted by the corresponding light-emitting devices 302 such that light emitted from one light-emitting device 302 does not bleed into the adjacent device cavity 360 or to the adjacent light pipe 314.

Figure 7:
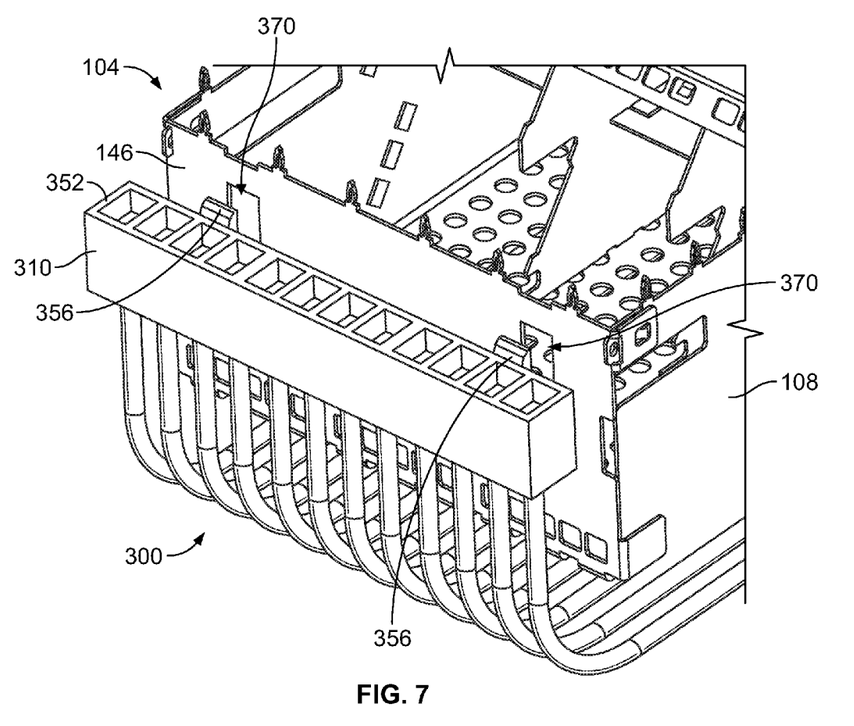
FIG. 7 illustrates a portion of a receptacle assembly for the communication system showing the light pipe assembly poised for coupling to a receptacle housing of the receptacle assembly.
Figure 8:
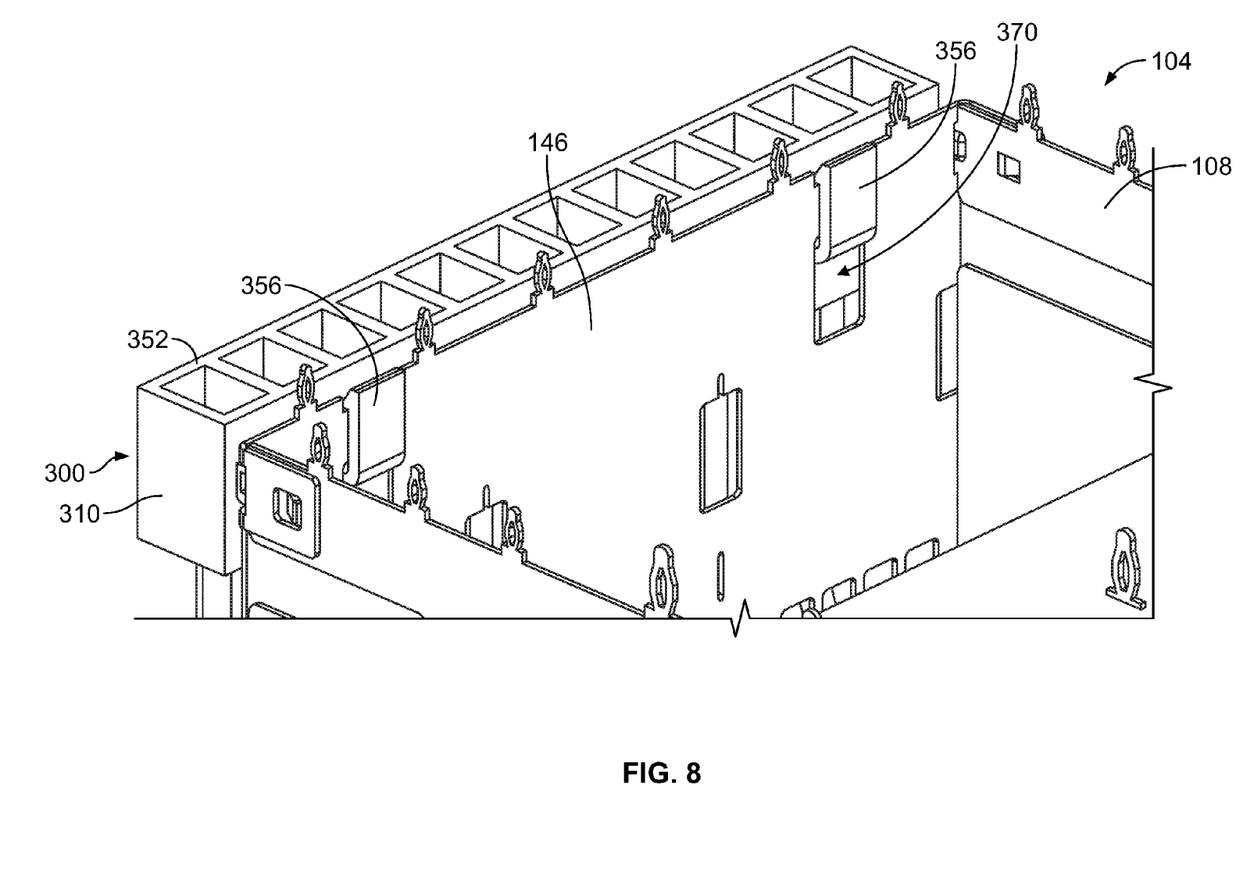
FIG. 8 is a bottom perspective view of the light pipe assembly mounted to the receptacle housing.

FIG. 7 illustrates a portion of the receptacle assembly 104 showing the light pipe assembly 300 poised for coupling to the receptacle housing 108. FIG. 8 is a bottom perspective view of the light pipe assembly 300 mounted to the receptacle housing 108. The receptacle housing 108 includes openings 370 in the back wall 146 sized and shaped to receive the mounting features 356. The circuit board support 310 may be coupled to the back wall 146 by loading the mounting features 356 through the openings 370 and securing the mounting features 356 to the back wall 146. The mounting features 356 may clip onto the back wall 146 to secure the position of the circuit board support 310 to the receptacle housing 108. The bottom 352 of the circuit board support 310 may be generally aligned with the bottom 138 of the receptacle housing 108 such that the bottom 352 of the circuit board support 310 may rest on the circuit board 102 (shown in FIG. 1).

Figure 9:
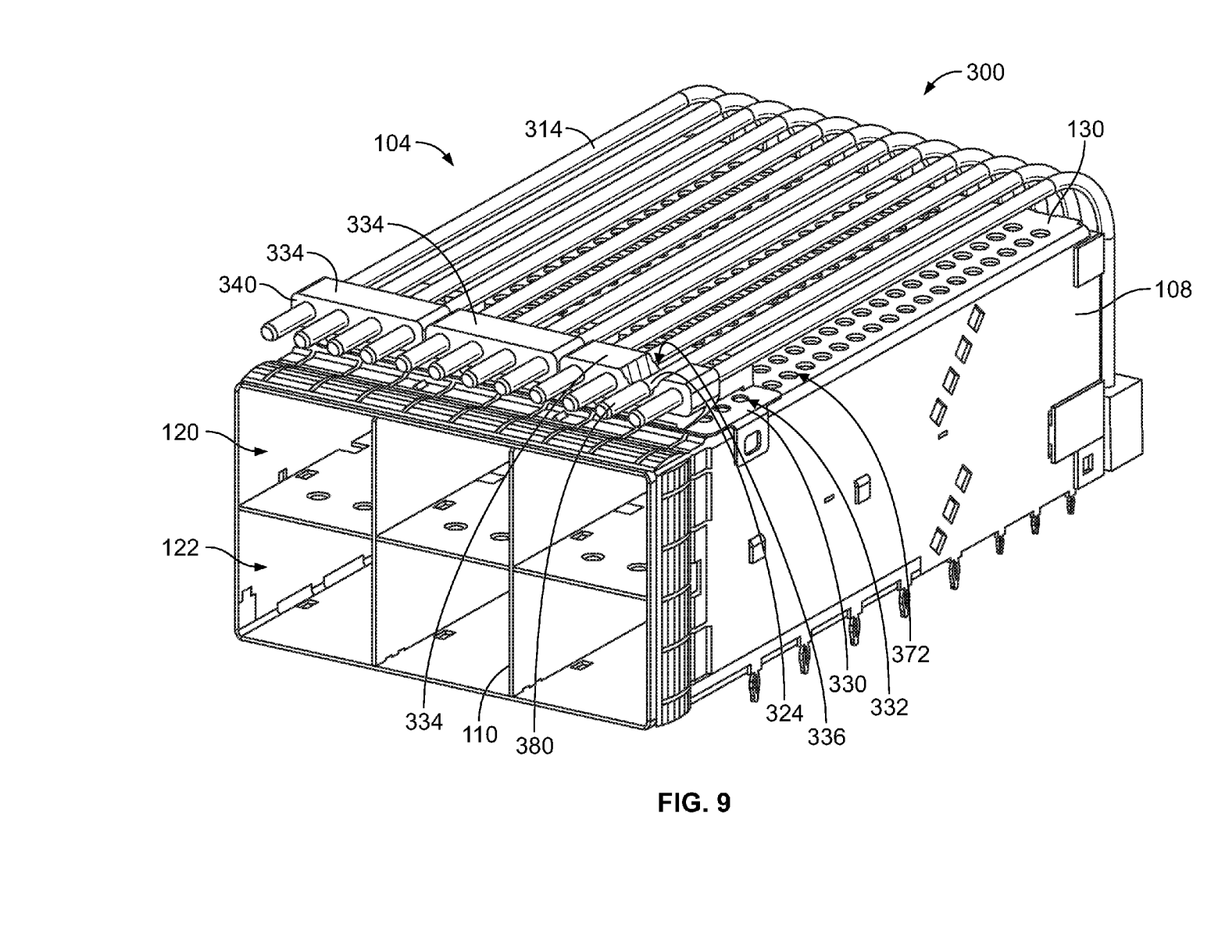
FIG. 9 is a front perspective view of the receptacle assembly showing the light pipe assembly in accordance with an exemplary embodiment coupled to the receptacle housing.

FIG. 9 is a front perspective view of the receptacle assembly 104 showing the light pipe assembly 300 coupled to the receptacle housing 108. The bracket 330 is coupled directly to the main panel 130 of the receptacle housing 108. The airflow openings 332 are aligned with airflow openings 372 of the panel 130 of the receptacle housing 108 to allow airflow through the bracket 330 and the panel 130.

The light pipe holders 334 are coupled to the bracket 330 and positioned at the front end 110. In the illustrated embodiment, a plurality of the light pipe holders 334 are provided and separately coupled to the bracket 330; however a single light pipe holder 334 may be used in alternative embodiments. The individual light pipe holders 334 correspond with the columns of module cavities 120, 122. As such, the number of light pipe holders 334 used corresponds with the number of columns of module cavities 120, 122 in the receptacle housing 108. The light pipe holders 334 are modular and any number of the light pipe holders 334 may be utilized.

In the illustrated embodiment, the light pipe holders 334 include lenses 380 at the front ends 340, rather than having the light pipes 314 extend entirely through the light pipe holders 334 as in the embodiment illustrated in FIGS. 4 and 5. The light-emitting ends 324 (one of which is shown in phantom in FIG. 9) are held inside the light pipe channels 336 and aligned with the lenses 380. Light is emitted from the light pipes 314 into the lenses 380 and directed to the front end 340 for displaying the status indicator for the corresponding communication connector 170 (shown in FIG. 3) and pluggable module 106 (shown in FIG. 2). The lenses 380 may be received in the bezel 304 (shown in FIG. 1).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A receptacle assembly comprising:
a receptacle housing having a plurality of panels defining a housing cavity configured to receive a pluggable module through a front end of the receptacle housing, the panels being conductive to provide electromagnetic interference (EMI) shielding, the receptacle housing having a bottom being configured to be mounted to a circuit board;
a communication module received in the housing cavity and configured to be mounted to the circuit board, the communication module including a communication connector configured to interface with the pluggable module; and
a light pipe assembly coupled to the receptacle housing, the light pipe assembly having a plurality of flexible light pipes each having a light pipe body extending between a light-receiving end and a light-emitting end, the light pipe body being flexible such that each of the flexible light pipes are independently movable relative to each other, the light-receiving end being positioned proximate to the bottom to receive light from a light-emitting device mounted to the circuit board proximate the receptacle assembly, the light-emitting end being provided proximate to the front end of the receptacle housing for displaying a status indicator for the communication connector.

2. The receptacle assembly of claim 1, wherein each light pipe body comprises a flexible fiber optic conductor.

3. The receptacle assembly of claim 1, wherein the light pipes are routed along an exterior of the panels of the receptacle housing.

4. The receptacle assembly of claim 1, wherein the light pipe body is cut to length based on dimensions of the panels of the receptacle housing.

5. The receptacle assembly of claim 1, wherein the light-receiving ends are held in a circuit board support mounted to the receptacle housing proximate to the bottom for receiving light emitted from light-emitting devices mounted to the circuit board.

6. The receptacle assembly of claim 5, wherein the circuit board support includes a plurality of device cavities separated from each other by separating walls to contain the light emitted by the corresponding light-emitting devices, the circuit board support including a plurality of light pipe cavities open to corresponding device cavities, the light pipe cavities receiving corresponding light pipes and aligning the light pipes with the corresponding light-emitting devices.

7. The receptacle assembly of claim 1, wherein the light-emitting ends are held by a bezel support mounted to the receptacle housing proximate to the front end, the bezel support having a light pipe holder having light pipe channels receiving corresponding light pipes and holding the light pipes at predetermined positions for displaying the status indicators.

8. A receptacle assembly comprising:
a receptacle housing having a plurality of panels defining a housing cavity configured to receive a pluggable module through a front end of the receptacle housing at a bezel, the panels being conductive to provide electromagnetic interference (EMI) shielding, the panels define a back wall opposite the front end, a top wall opposite a bottom of the receptacle housing and side walls surrounding the housing cavity, the receptacle housing having a bottom being configured to be mounted to a circuit board;
a communication module received in the housing cavity and configured to be mounted to the circuit board, the communication module including a communication connector configured to interface with the pluggable module; and
a light pipe assembly coupled to the receptacle housing, the light pipe assembly having a circuit board support, a bezel support and a plurality of flexible light pipes extending between the circuit board support and the bezel support, the circuit board support being coupled to the receptacle housing proximate to the bottom for positioning near the circuit board, the bezel support being positioned proximate to the front end of the receptacle housing for positioning near the bezel, each light pipe having a light pipe body extending between a light-receiving end and a light-emitting end, the light pipe body being flexible, the light-receiving end being received in the circuit board support to receive light from a light-emitting device mounted to the circuit board proximate the receptacle assembly, the light-emitting end being held by the bezel support proximate to the front end of the receptacle housing for displaying a status indicator for the communication connector, wherein each of the light receiving ends of the flexible light pipes are independently movable relative to the circuit board support and wherein each of the light-emitting ends are independently movable relative to the bezel support.

9. The receptacle assembly of claim 8, wherein each light pipe body comprises a flexible fiber optic conductor.

10. The receptacle assembly of claim 8, wherein the light pipes are independently loaded into and removable from the circuit board support and the bezel support such that the light pipes are configured to be routed along an exterior of the panels of the receptacle housing between the circuit board support and the bezel support.

11. The receptacle assembly of claim 8, wherein the circuit board support is coupled to the back wall proximate to the bottom of the receptacle housing.

12. The receptacle assembly of claim 8, wherein the circuit board support includes a plurality of device cavities separated from each other by separating walls to contain the light emitted by the corresponding light-emitting devices.

13. The receptacle assembly of claim 8, wherein the circuit board support includes a plurality of light pipe cavities receiving corresponding light pipes and aligning the light pipes with the corresponding light-emitting devices.

14. The receptacle assembly of claim 8, wherein the circuit board support includes mounting features engaging the receptacle housing to secure the light pipe assembly to the receptacle housing.

15. The receptacle assembly of claim 8, wherein the bezel support includes a bracket mounted to the receptacle housing to secure the light pipe assembly to the receptacle housing, the bracket having airflow openings therethrough, the bracket being mounted to the receptacle housing such that the airflow openings of the bracket are aligned with corresponding airflow openings of the corresponding panel of the receptacle housing to allow airflow through the bracket and the panel.

16. The receptacle assembly of claim 8, wherein the bezel support is configured to be mounted to the bezel and held proximate to the front end by the bezel.

17. The receptacle assembly of claim 8, wherein the bezel support includes a light pipe holder having light pipe channels receiving corresponding light pipes and holding the light pipes at predetermined positions for displaying the status indicators.

18. The receptacle assembly of claim 17, wherein the light pipe holder includes lenses extending forward of corresponding light pipe channels, the lenses receiving light emitted from the light pipes to display the light forward of the receptacle housing.

19. The receptacle assembly of claim 17, wherein the light pipes extend entirely through the light pipe holder and are exposed forward of the light pipe holder such that the light-emitting ends are visible forward of the receptacle housing for displaying the status indicators.

20. A communication system comprising:
a circuit board having a mounting area and a plurality of light-emitting devices proximate the mounting area;
a bezel forward of the circuit board, the bezel having an opening; and
a receptacle assembly mounted to the mounting area and extending behind the opening in the bezel, the receptacle assembly comprising:
a receptacle housing having a plurality of panels defining a housing cavity aligned with the opening in the bezel, the housing cavity being configured to receive a pluggable module through a front end of the receptacle housing, the panels being conductive to provide electromagnetic interference (EMI) shielding, the panels define a back wall opposite the front end, a top wall opposite a bottom of the receptacle housing and side walls surrounding the housing cavity, the bottom of the receptacle housing being mounted to the circuit board;
a communication module received in the housing cavity and mounted to the circuit board, the communication module including a communication connector configured to interface with the pluggable module; and
a light pipe assembly coupled to the receptacle housing, the light pipe assembly having a circuit board support, a bezel support and a plurality of flexible light pipes extending between the circuit board support and the bezel support, the circuit board support being coupled to the receptacle housing proximate to the bottom for positioning near the circuit board, the bezel support being positioned proximate to the front end of the receptacle housing for positioning near the bezel, each light pipe having a light pipe body extending between a light-receiving end and a light-emitting end, the light pipe body being flexible, the light-receiving end being received in the circuit board support to receive light from the corresponding light-emitting device, the light-emitting end being held by the bezel support proximate to the front end of the receptacle housing for displaying a status indicator for the communication connector forward of the bezel.

* * * * *